(12) United States Patent
Su et al.

(10) Patent No.: US 7,671,952 B2
(45) Date of Patent: Mar. 2, 2010

(54) MULTI-DOMAIN VERTICAL ALIGNMENT LIQUID CRYSTAL DISPLAY PANEL

(75) Inventors: Mu-Jen Su, Hsin-Chu (TW); Chih-Ming Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 343 days.

(21) Appl. No.: 11/749,748

(22) Filed: May 16, 2007

(65) Prior Publication Data
US 2008/0180607 A1    Jul. 31, 2008

(30) Foreign Application Priority Data
Jan. 29, 2007  (TW) ............... 96103229 A

(51) Int. Cl.
G02F 1/1337  (2006.01)
G02F 1/1343  (2006.01)
G02F 1/1335  (2006.01)

(52) U.S. Cl. ............ 349/129; 349/144; 349/146; 349/106

(58) Field of Classification Search ......... 349/129, 349/144, 146, 106
See application file for complete search history.

(56) References Cited

U.S. PATENT DOCUMENTS 6,504,592 B1 * 1/2003 Takatori et al. ............ 349/129
7,001,714 B2 * 2/2006 Takagi et al. ............... 430/321
7,145,619 B2 * 12/2006 Sawasaki et al. ........... 349/129
7,511,789 B2 * 3/2009 Inoue et al. ................ 349/129
2001/0030726 A1 * 10/2001 Yoshida et al. ............. 349/117

FOREIGN PATENT DOCUMENTS

| CN | 1385738 A | 12/2002 |
|---|---|---|
| CN | 1244843 C | 3/2006 |
| CN | 1818758 A | 8/2006 |
| JP | 11-242211 | 9/1999 |
| JP | 2000-081622 | 3/2000 |
| JP | 2000-081623 | 3/2000 |
| JP | 2000-356775 | 12/2000 |
| JP | 2005-274668 | 10/2005 |

* cited by examiner

Primary Examiner—Mike Qi
(74) Attorney, Agent, or Firm—Winston Hsu

(57) ABSTRACT

A liquid crystal display panel is disclosed. The liquid crystal display panel includes a bottom substrate, a plurality of wires disposed on the bottom substrate, a plurality of pixel units electrically connected to the wires, a top substrate disposed opposite to the bottom substrate, a liquid crystal layer disposed between the top and bottom substrates, and at least one protrusion disposed on the top substrate corresponding to the wires formed between two adjacent pixel units. Each pixel unit includes a thin film transistor and a pixel electrode disposed on the bottom substrate. The pixel electrode is electrically connected to the thin film transistor, in which the pixel electrode has a plurality of main slits.

16 Claims, 16 Drawing Sheets

MULTI-DOMAIN VERTICAL ALIGNMENT LIQUID CRYSTAL DISPLAY PANEL

BACKGROUND OF THE INVENTION

1. Field of the Invention

The invention relates to a liquid crystal display panel, and more particularly, to a multi-domain vertical alignment liquid crystal display panel.

2. Description of the Prior Art

Liquid crystal displays (LCDs) are commonly utilized in various electronic products including cell phones, PDAs, and notebook computers. As the market demand for flat display panels continues to increase, liquid crystal displays become popular due to the advantages such as thin and lightweight. In fact, liquid crystal displays are gradually replacing cathode ray tube (CRT) displays that had dominated the market for so many years. However, the viewing angle of a conventional liquid crystal display is not wide enough to ensure a high display quality, therefore, multi-domain vertical alignment (MVA) liquid crystal displays capable of orientating liquid crystals in various directions are proposed to improve the above problem.

Please refer to FIG. 1A. FIG. 1A illustrates a cross-sectional view of an MVA LCD panel 10 according to the prior art. As shown in FIG. 1A, the MVA LCD panel 10 includes a top substrate 12, a bottom substrate 14, a liquid crystal layer 16 composed of negative liquid crystals disposed between the top substrate 12 and the bottom substrate 14, a common electrode 18 disposed on the top substrate 12 opposite to the bottom substrate 14, a color filter 15 disposed between the top substrate 12 and the common electrode 18, a plurality of protrusions 22 disposed over the common electrode 18 opposite to the bottom substrate 14, and a plurality of thin film transistors and pixel electrodes 28 disposed on the bottom substrate 14.

Please refer to FIG. 1B. FIG. 1B illustrates a plan view of a pixel unit of a MVA LCD panel according to the prior art. As shown in FIG. 1B, the MVA LCD panel includes a plurality of pixel units (only a pixel unit 180 is shown in the figure) and a plurality of scan lines 182 and data lines 184 disposed surrounding the pixel units 180. Each of the pixel units 180 includes a pixel electrode 186 composed of indium tin oxide or indium zinc oxide and a switch element (not shown), and each pixel electrode 186 includes a plurality of main slits 190 and fine slits 192, and a plurality of protrusions 188 disposed respectively above the central region of the pixel electrode 186.

SUMMARY OF THE INVENTION

A liquid crystal display panel is disclosed. The liquid crystal display panel includes a bottom substrate, a plurality of wires disposed on the bottom substrate, a plurality of pixel units electrically connected to the wires, a top substrate disposed opposite to the bottom substrate, a liquid crystal layer disposed between the top and bottom substrates, and at least one protrusion disposed on the top substrate corresponding to the wires formed between two adjacent pixel units. Each pixel unit includes a thin film transistor and a pixel electrode disposed on the bottom substrate. The pixel electrode is electrically connected to the thin film transistor, in which the pixel electrode has a plurality of main slits.

It is an objective of the present invention to provide a multi-domain vertical alignment liquid crystal display panel for improving the problem of poor liquid crystal arrangement or low aperture ratio caused by the increased number of protrusions.

Specifically, the protrusions of the present invention are disposed on the top substrate where correspond to the scan lines or the data lines, such that the quantity of protrusions can be reduced significantly while fabricating high resolution liquid crystal displays. Additionally, a plurality of main slits is formed in the pixel electrode and the quantity of protrusions is reduced to increase the aperture ratio of the display panel, increase the stability of the liquid crystal arrangement, reduce the opportunity of light leakage during dark state and increase the overall contrast.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
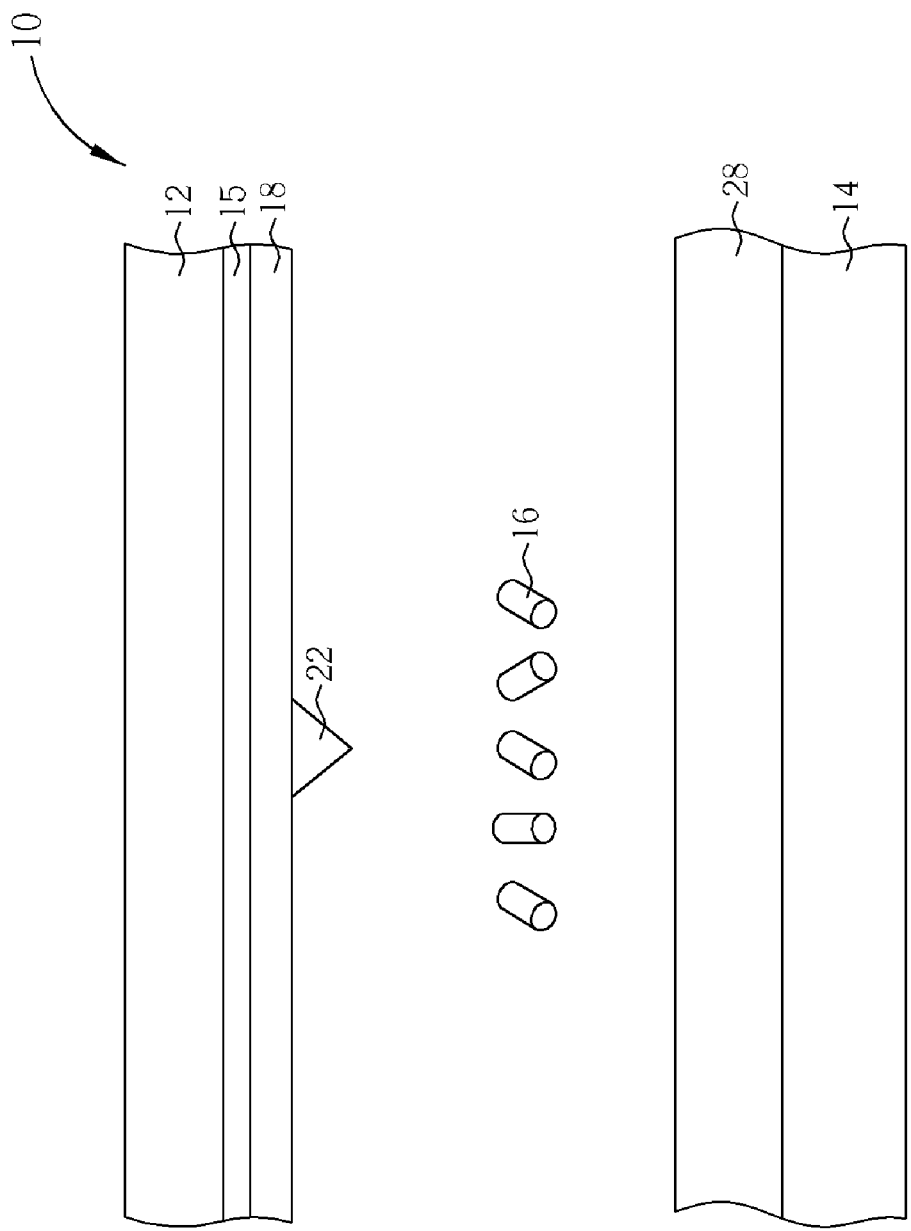
FIG. 1A illustrates a cross-sectional view of a MVA LCD panel according to the prior art.
Figure 1B:
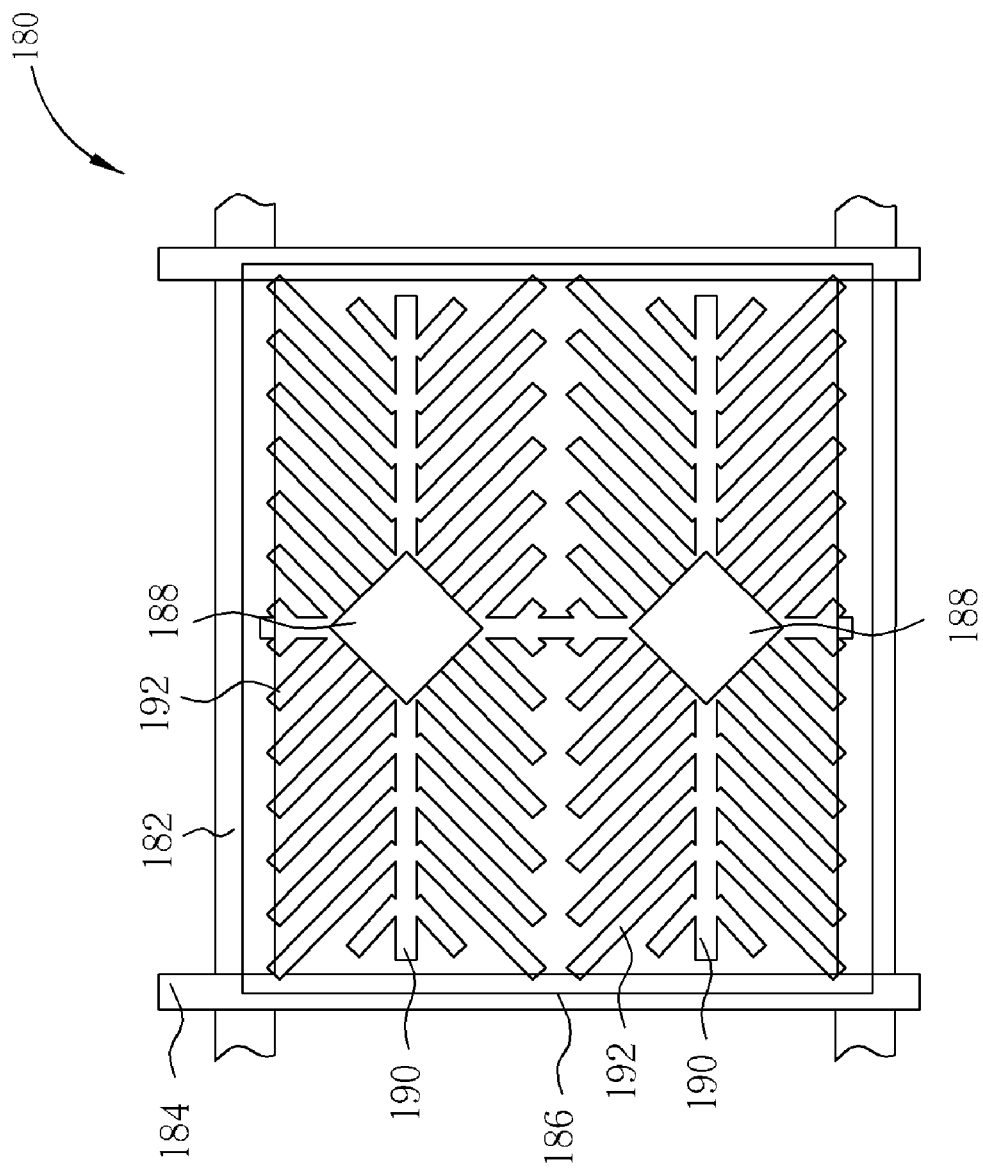
FIG. 1B illustrates a plan view of a pixel unit of a MVA LCD panel according to the prior art.
Figure 2:
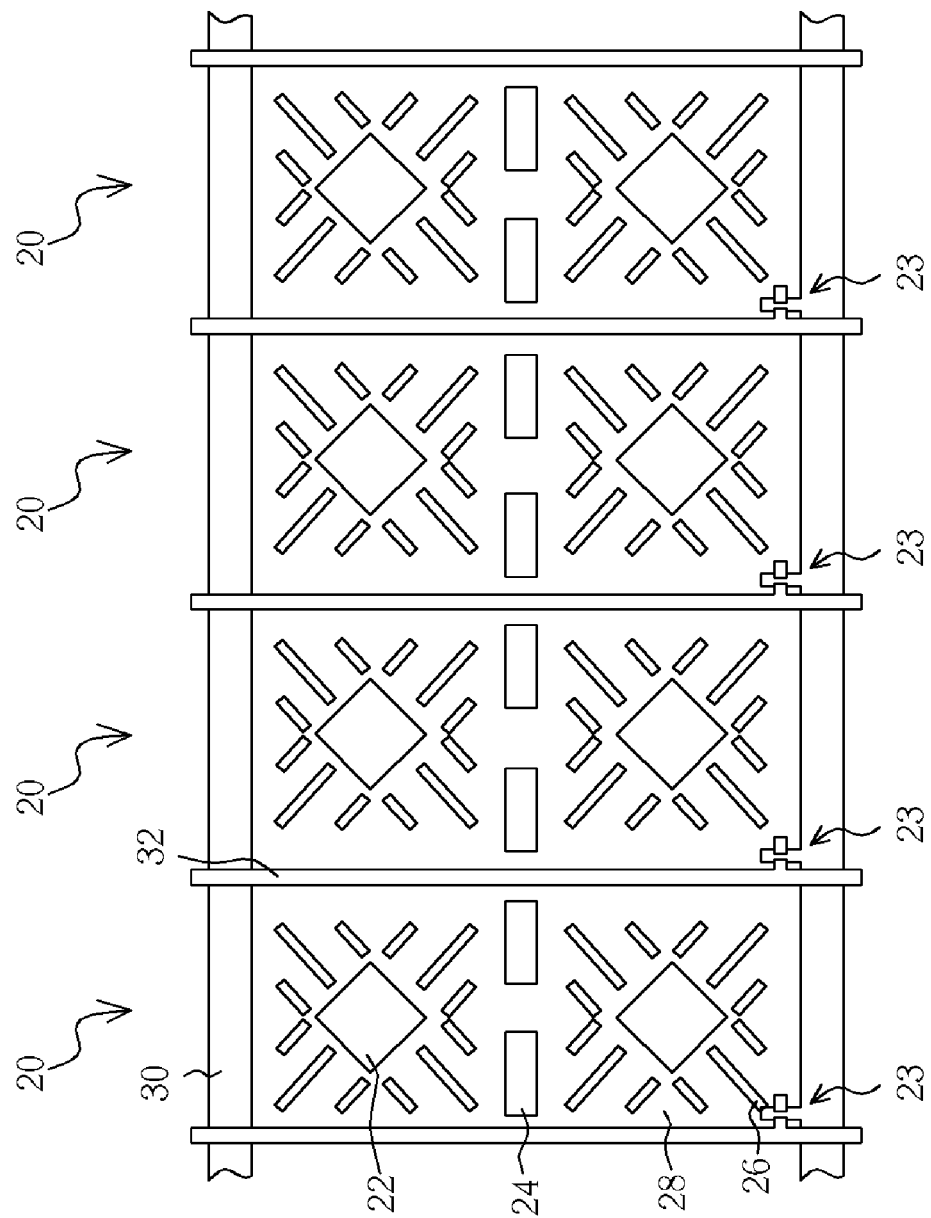
FIG. 2 illustrates a plan view of a pixel unit of a MVA LCD panel according to the present invention.

Please refer to FIG. 2. FIG. 2 illustrates a plan view of a pixel unit of a MVA LCD panel according to the present invention. As shown in FIG. 2, the MVA LCD panel includes a plurality of pixel units 20 and a plurality of scan lines 30 and data lines 32 disposed between the pixel units 20. Each pixel unit 20 includes a pixel electrode 28, in which the pixel electrode 28 is composed of indium tin oxide or indium zinc oxide. Each pixel electrode 28 has a plurality of main slits 24 and fine slits 26. A plurality of protrusions 22 is disposed on the top substrate where correspond to the central region of the pixel electrode 28 divided by the main slits 24. The pixel unit 20 is driven by a switch element 23 electrically connected to the scan lines 30, the data lines 32, and the pixel electrode 28, in which the switch element 23 is preferably a thin film transistor. Depending on the design of the product, the main slits 24 and the fine slits 26 can be formed in the pixel electrode 28 or extended to the edge of the pixel electrode 28.

Typically, the protrusions occupy a relatively large proportion of the liquid crystal display panel. Despite the development of small size display panels continues to move toward a direction of high resolution, the reduction of the size of the protrusions still remains a difficult task due to the fabrication limitation of the color filters.

The protrusions of conventional MVA LCD panels are typically positioned with respect to the central region of pixel unit to facilitate the arrangement of the liquid crystals. Nevertheless, as resolution increases (pixel size become smaller), protrusion size can not decrease synchronously. The density of protrusion in pixel increases and leads to low aperture ratio and low brightness. Moreover, uneven arrangement of the liquid crystals surrounding the protrusions also causes light leakage and lowering of contrast. Hence, how to effectively reduce the quantity of protrusions for reducing the problem of uneven liquid crystal arrangement and light leakage during dark state has become an important task.

First Embodiment

Figure 3:
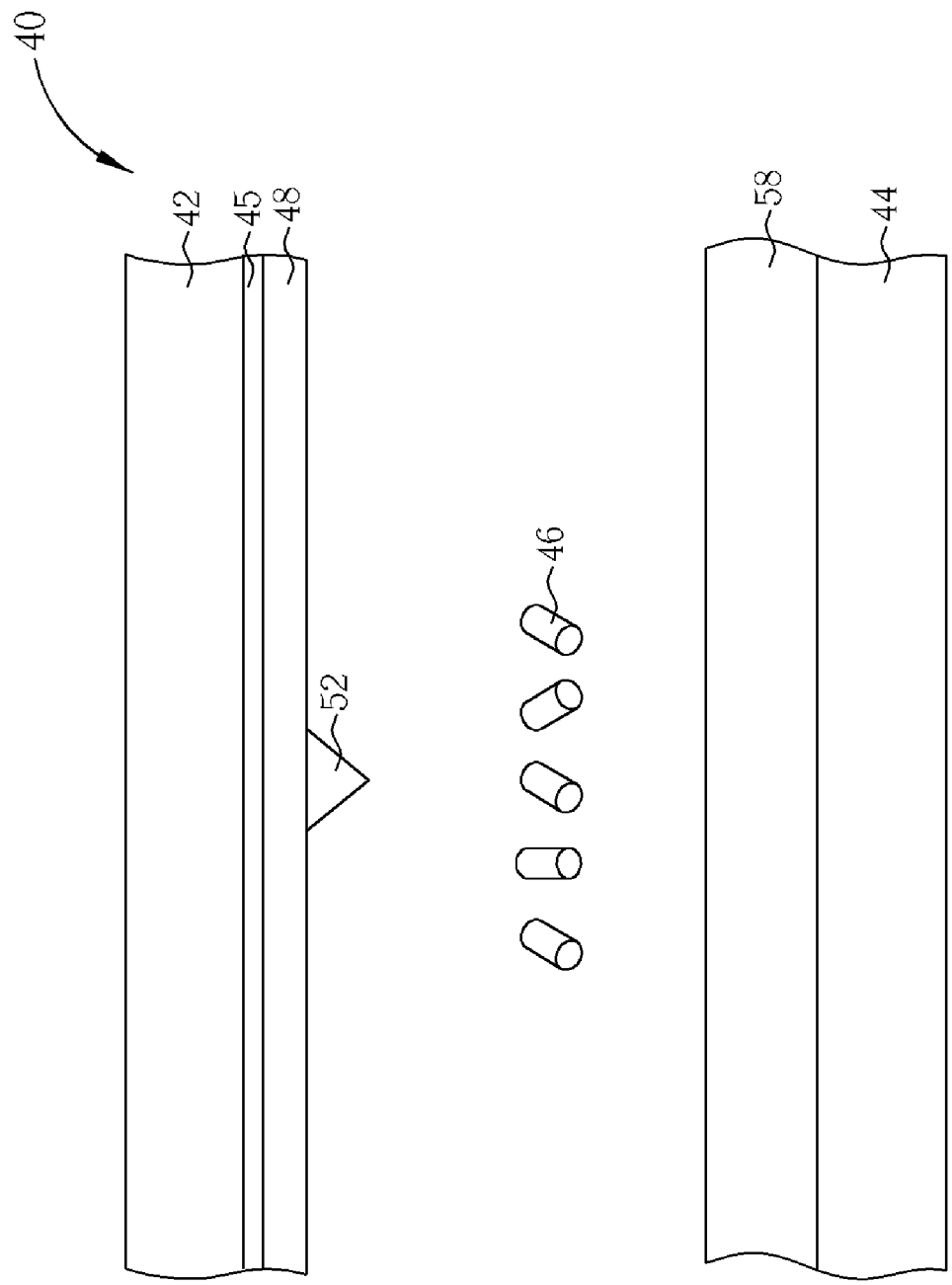
FIG. 3 illustrates a cross-sectional view of a MVA LCD panel according to the first embodiment of the present invention.

Please refer to FIG. 3. FIG. 3 illustrates a cross-sectional view of an MVA LCD panel 40 according to the first embodiment of the present invention. As shown in FIG. 3, the MVA LCD panel 40 includes a top substrate 42, a bottom substrate 44, a liquid crystal layer 46 disposed between the top substrate 42 and the bottom substrate 44, a common electrode 48 disposed on the top substrate 42, a color filter 45 disposed between the top substrate 42 and the common electrode 48, a plurality of protrusions 52 disposed on the common electrode 48, and a plurality of thin film transistors (not shown) and pixel electrodes 58 disposed on the bottom substrate 44. The liquid crystal layer 46 can be composed of negative or positive liquid crystals. Alternatively, the color filter 45 can be formed on the bottom substrate 44 to form a color filter on array substrate, which are all within the scope of the present invention.

Figure 4:
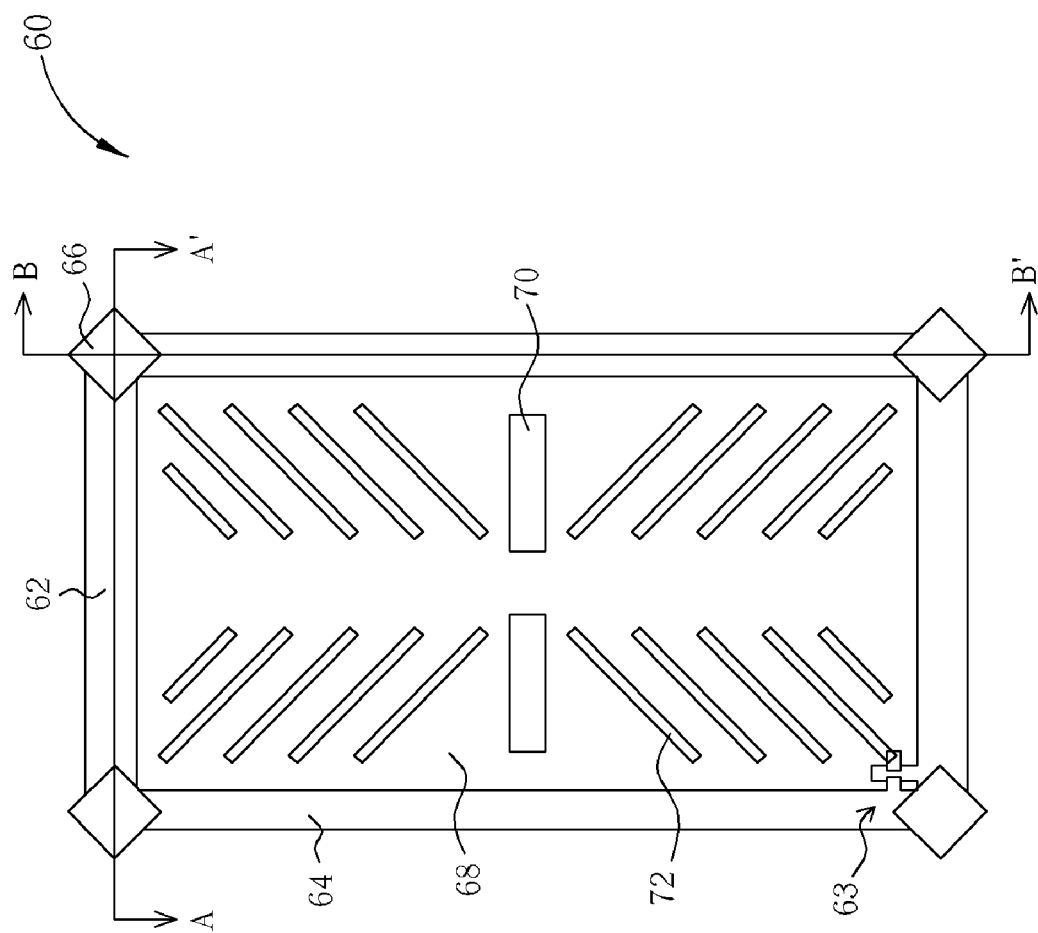
FIG. 4 illustrates a plan view of a pixel unit of the MVA LCD panel according to the first embodiment of the present invention.
Figure 5:
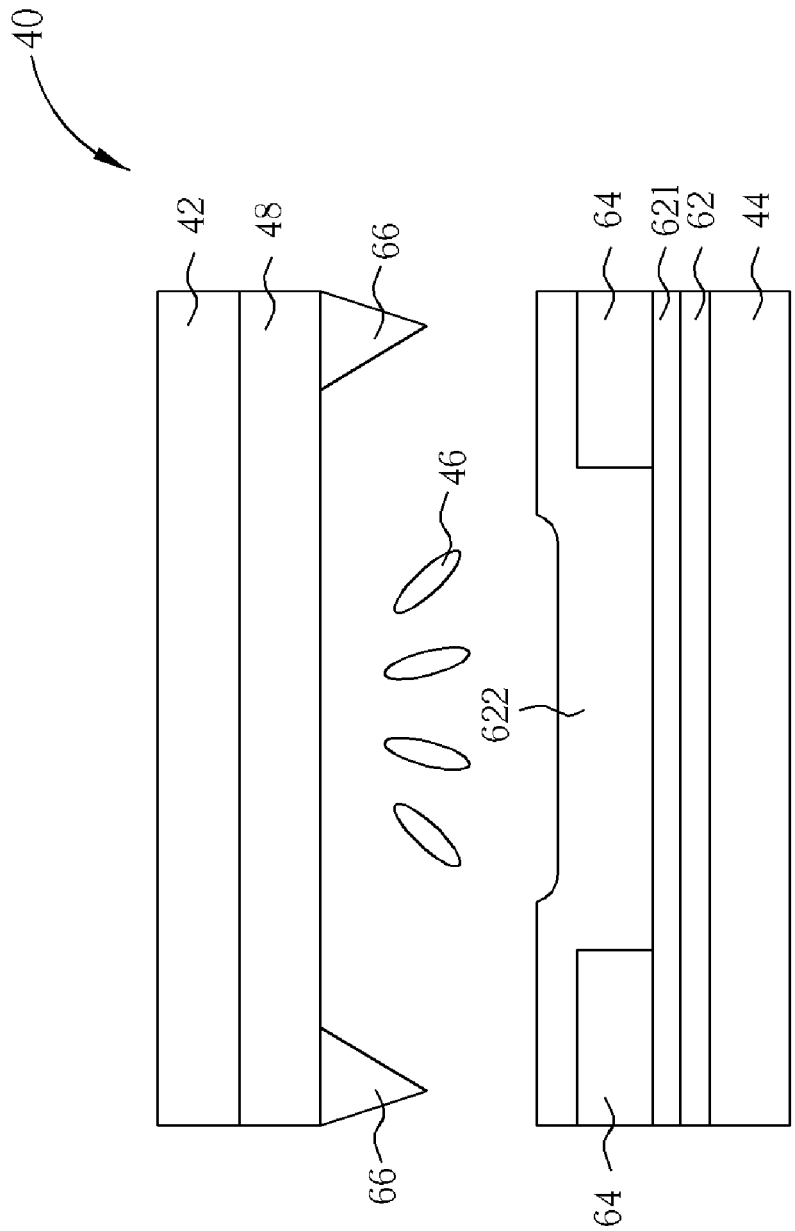
FIG. 5 illustrates a cross-sectional view taken along line AA' of FIG. 4.
Figure 6:
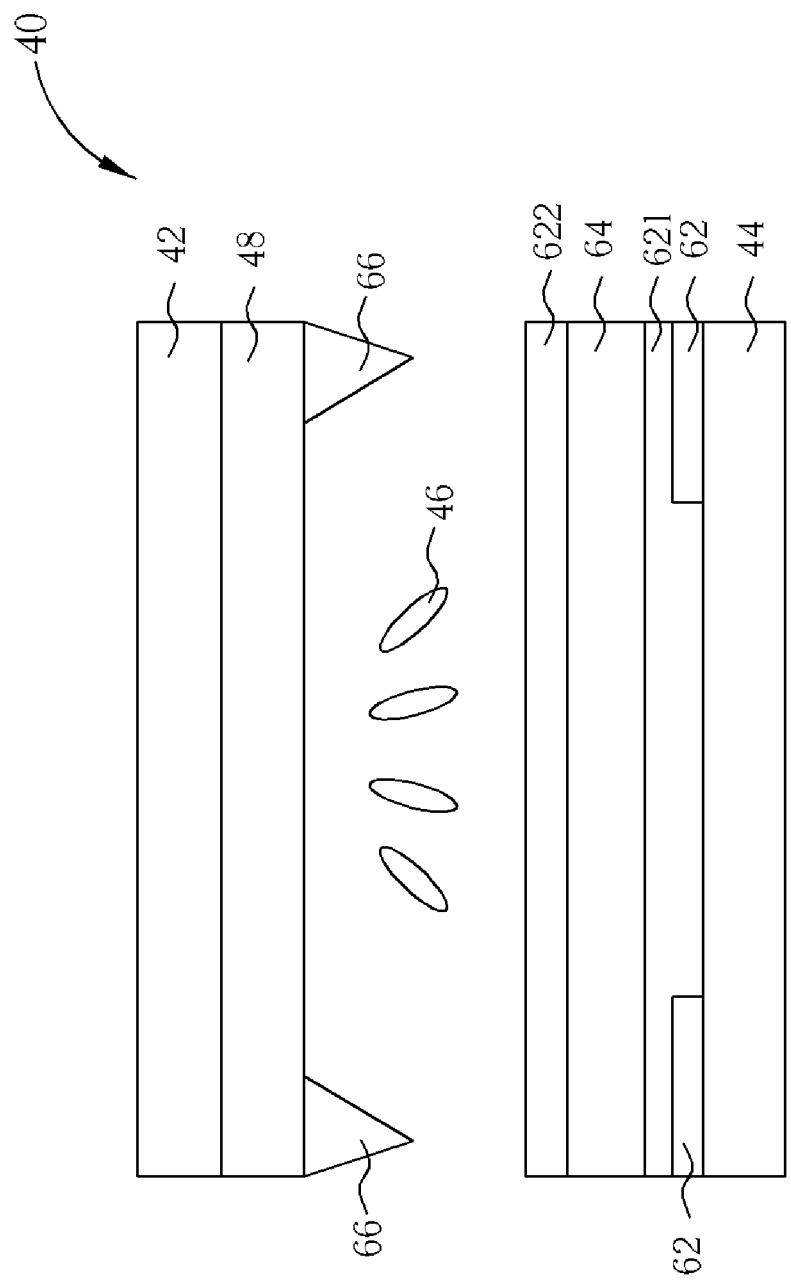
FIG. 6 illustrates a cross-sectional view taken along line BB' of FIG. 4.

Please refer to FIGS. 4-6. FIG. 4 illustrates a plan view of a pixel unit 60 of the MVA LCD panel according to the first embodiment of the present invention. FIG. 5 and FIG. 6 illustrate cross-sectional views respectively taken along line AA' and line BB' of FIG. 4. As shown in FIG. 4, the MVA LCD panel 40 includes a pixel unit 60, a plurality of scan lines 62 and data lines 64 disposed around the pixel unit 60, and a plurality of rectangular or circular protrusions 66 disposed on the top substrate where correspond to the overlapped region of the scan lines 62 and data lines 64. As shown in FIG. 5 and FIG. 6, a first dielectric 621 is disposed between the scan line 62 and the data line 64, and a second dielectric 622 is disposed on the first dielectric 621 and the data line 64. The protrusions 66 are positioned on the top substrate 42 corresponding to the overlapped region of the scan line 62 and data line 64.

Referring back to FIG. 4, the pixel unit 60 is driven by a switch element 63 electrically connected to the scan lines 62, the data lines 64, and the pixel electrode 68, in which the switch element 63 can be a thin film transistor. The pixel unit 60 includes a pixel electrode 68, in which the pixel electrode 68 is composed of indium tin oxide or indium zinc oxide. The pixel electrode 68 also has a plurality of main slits 70 and fine slits 72, in which the fine slits 72 are arranged in a radiating manner. Depending on the design of the product, the main slits 70 and the fine slits 72 can be formed in the pixel electrode 68 or extended to the edge of the pixel electrode 68. Additionally, the main slits 70 and the fine slits 72 can be arranged according to the manner disclosed in Taiwan Patent No. 95127983, which are all within the scope of the present invention.

Second Embodiment

Figure 7:
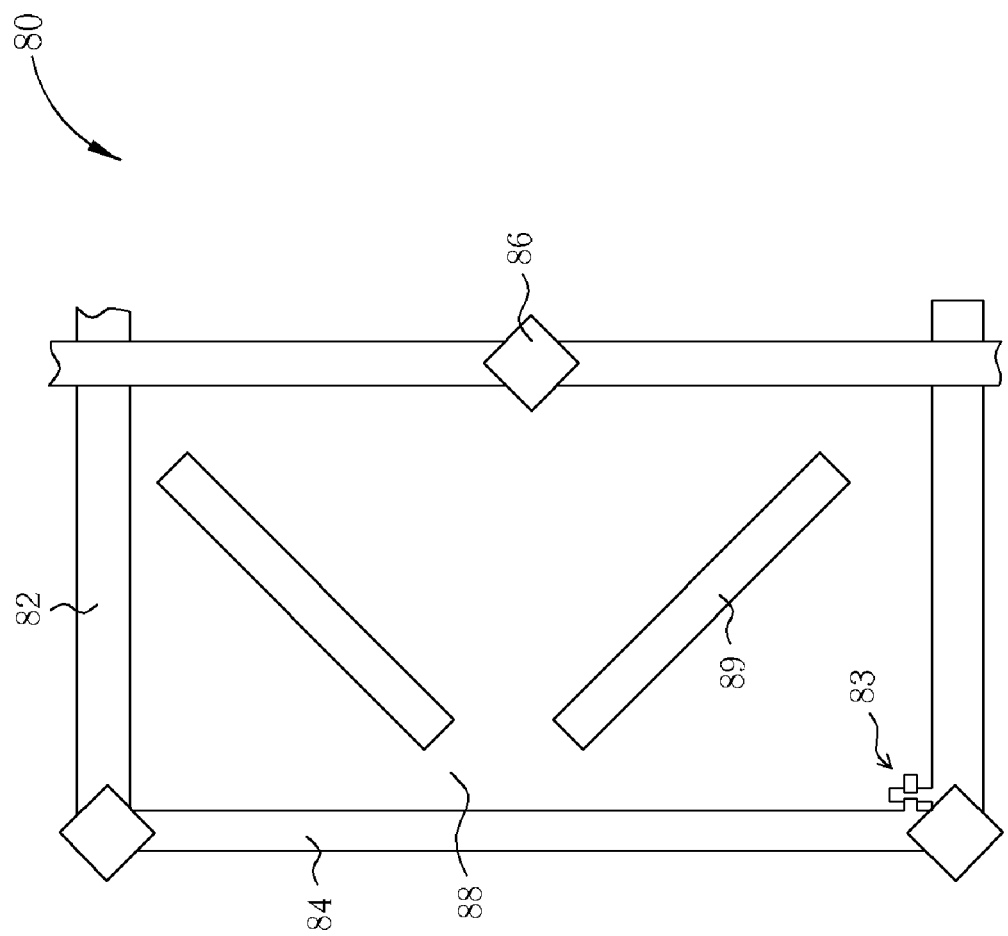
FIG. 7 illustrates a plan view of a pixel unit of the MVA LCD panel according to the second embodiment of the present invention.

Please refer to FIG. 7. FIG. 7 illustrates a plan view of a pixel unit 80 of the MVA LCD panel according to the second embodiment of the present invention. As shown in FIG. 7, the MVA LCD panel includes a pixel unit 80, a plurality of scan lines 82 and data lines 84 disposed around the pixel unit 80, and a plurality of protrusions 86 disposed on the top substrate where correspond to the scan lines 82 and data lines 84. The pixel unit 80 is driven by a switch element 83 electrically connected to the scan lines 82, the data lines 84, and the pixel electrode 88, in which the switch element 83 is preferably a thin film transistor.

The pixel unit 80 includes a pixel electrode 88 having a plurality of main slits 89. Depending on the design of the product, the main slits 89 can be formed in the pixel electrode 88 or extended to the edge of the pixel electrode 88. In contrast to the first embodiment, the left protrusions 86 of the second embodiment are positioned corresponding to the overlapped portion of the scan lines 82 and data lines 84, whereas the right protrusion 86 is disposed corresponding to the central region of the right data line 84.

Third Embodiment

Figure 8:
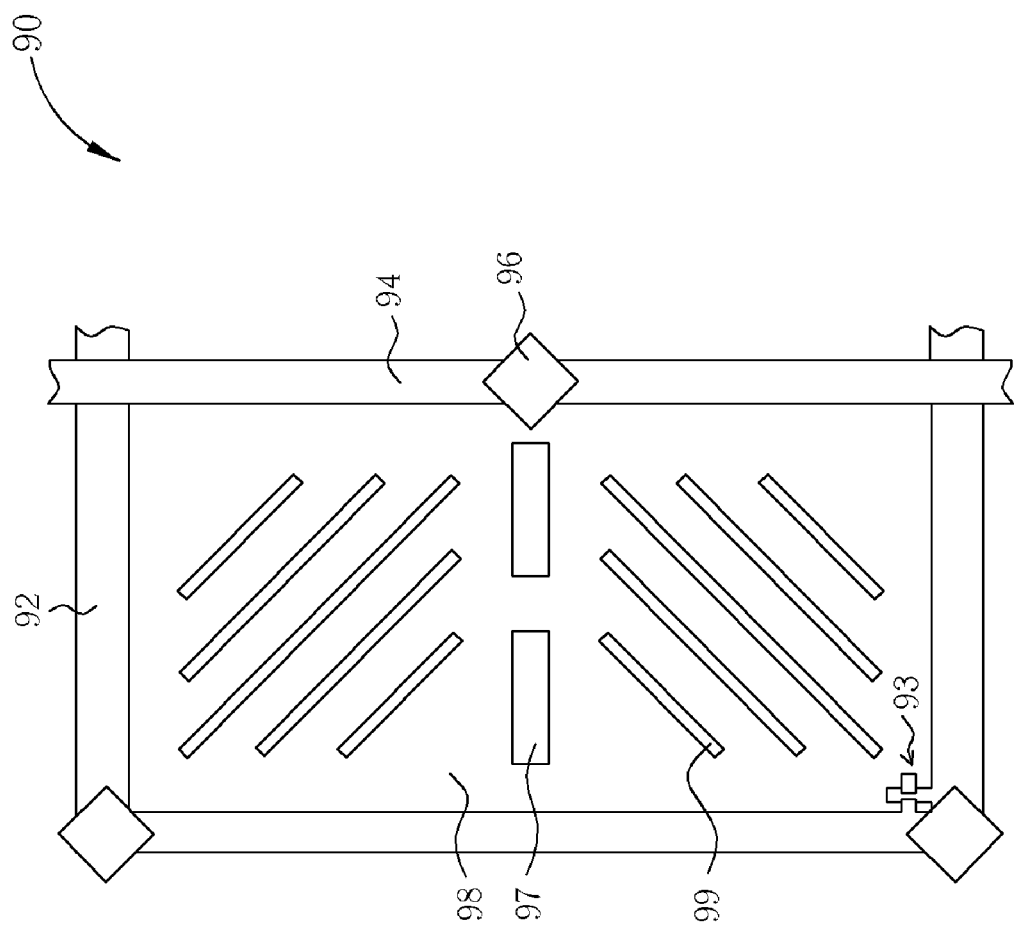
FIG. 8 illustrates a plan view of a pixel unit of the MVA LCD panel according to the third embodiment of the present invention.

Please refer to FIG. 8. FIG. 8 illustrates a plan view of a pixel unit 90 of the MVA LCD panel according to the third embodiment of the present invention. As shown in FIG. 8, the MVA LCD panel includes a pixel unit 90, a plurality of scan lines 92 and data lines 94 disposed around the pixel unit 90, and a plurality of protrusions 96 disposed on the top substrate where correspond to the scan lines 92 and data lines 94. The pixel unit 90 is driven by a switch element 93 electrically connected to the scan lines 92, the data lines 94, and the pixel electrode 98, in which the switch element 93 is preferably a thin film transistor.

The pixel unit 90 includes a pixel electrode 98 having a plurality of main slits 97 and fine slits 99. Depending on the design of the product, the main slits 97 and the fine slits 99 can be formed in the pixel electrode 98 or extended to the edge of the pixel electrode 98. Similar to the second embodiment of the present invention, the left protrusions 96 are disposed corresponding to the overlapped portion of the scan lines 92 and data lines 94, and the right protrusion 96 is disposed corresponding to the central region of the right data line 94.

Fourth Embodiment

Figure 9:
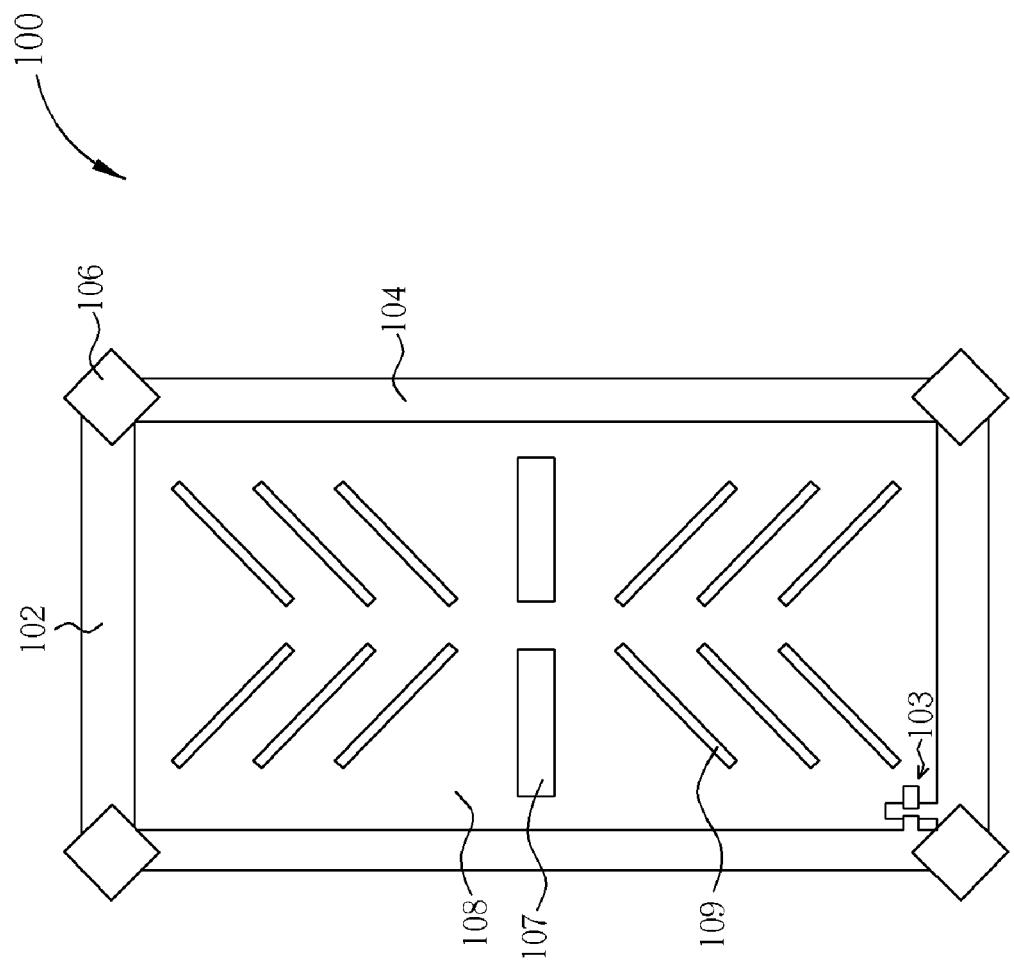
FIG. 9 illustrates a plan view of a pixel unit of the MVA LCD panel according to the fourth embodiment of the present invention.

Please refer to FIG. 9. FIG. 9 illustrates a plan view of a pixel unit 100 of the MVA LCD panel according to the fourth embodiment of the present invention. As shown in FIG. 9, the MVA LCD panel includes a pixel unit 100, a plurality of scan lines 102 and data lines 104 disposed around the pixel unit 100, and a plurality of protrusions 106 disposed on the top substrate where correspond to the scan lines 102 and data lines 104. The pixel unit 100 is driven by a switch element 103 electrically connected to the scan lines 102, the data lines 104, and the pixel electrode 108, in which the switch element is preferably a thin film transistor.

The pixel unit 100 includes a pixel electrode 108 having a plurality of main slits 107 and fine slits 109. Depending on the design of the product, the main slits 107 and the fines slits 109 can be formed in the pixel electrode 108 or extended to the edge of the pixel electrode 108. Similar to the first embodiment of the present invention, the protrusions 106 of the fourth embodiment are disposed corresponding to the overlapped portion of the scan lines 102 and data lines 104.

Fifth Embodiment

Figure 10:
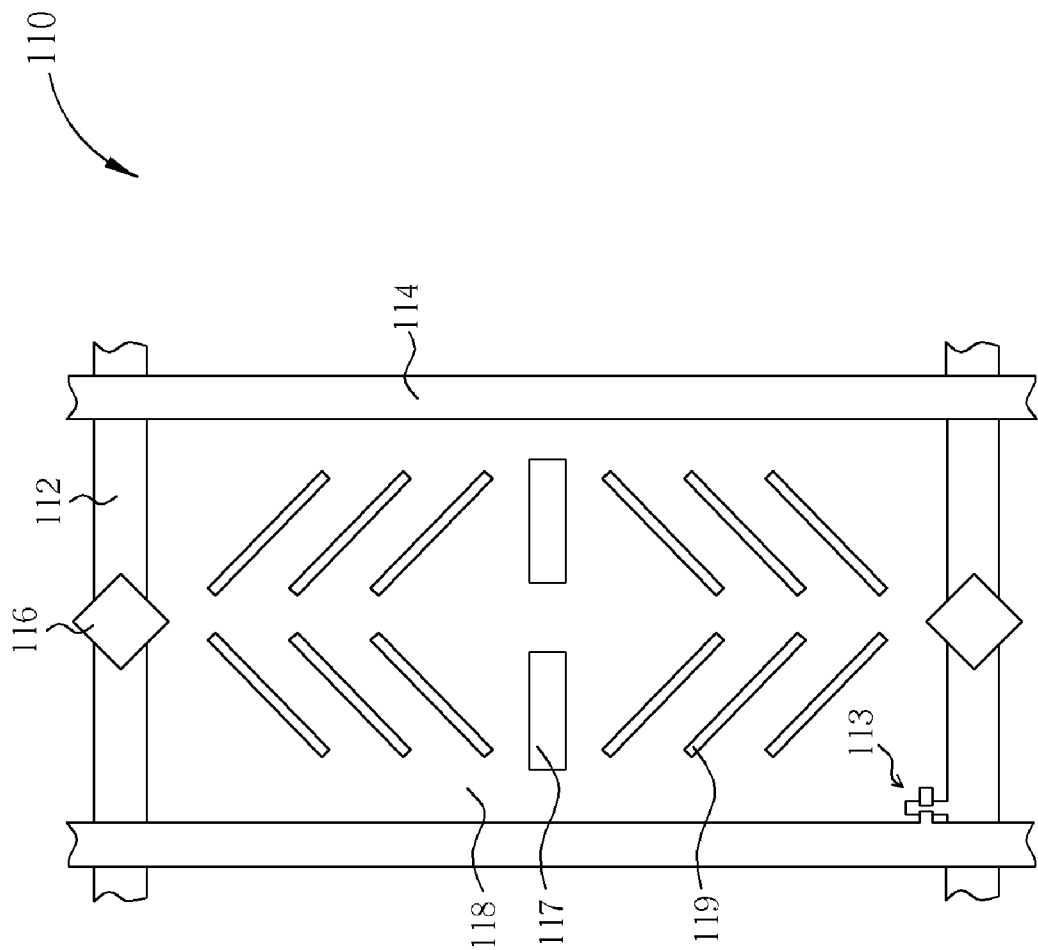
FIG. 10 illustrates a plan view of a pixel unit of the MVA LCD panel according to the fifth embodiment of the present invention.

Please refer to FIG. 10. FIG. 10 illustrates a plan view of a pixel unit 110 of the MVA LCD panel according to the fifth embodiment of the present invention. As shown in FIG. 10, the MVA LCD panel includes a pixel unit 110, a plurality of scan lines 112 and data lines 114 disposed around the pixel unit 110, and a plurality of protrusions 116 disposed on the top substrate where correspond to the scan lines 112. The pixel unit 110 is driven by a switch element 113 electrically connected to the scan lines 112, the data lines 114, and the pixel electrode 118, in which the switch element 113 is preferably a thin film transistor.

The pixel unit 110 includes a pixel electrode 118 having a plurality of main slits 117 and fine slits 119. Depending on the design of the product, the main slits 117 and the fine slits 119 can be formed in the pixel electrode 118 or extended to the edge of the pixel electrode 118. As shown in FIG. 10, the protrusions 116 of the fifth embodiment are disposed corresponding to the center of each scan line 112.

Sixth Embodiment

Figure 11:
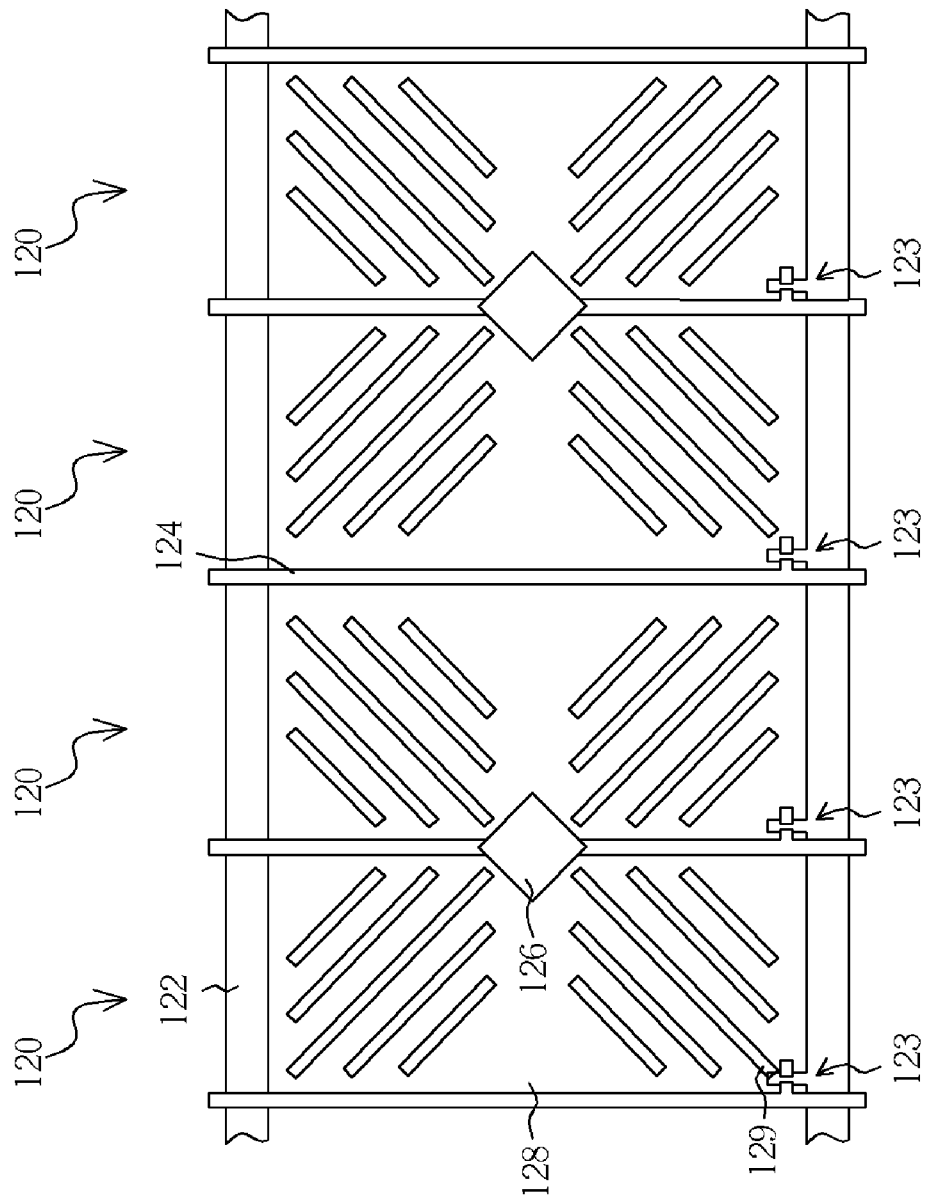
FIG. 11 illustrates a plan view of the pixel units of the MVA LCD panel according to the sixth embodiment of the present invention.

Please refer to FIG. 11. FIG. 11 illustrates a plan view of the pixel units of the MVA LCD panel according to the sixth embodiment of the present invention. As shown in FIG. 11, the MVA LCD panel includes four pixel units 120, a plurality of scan lines 122 and data lines 124 disposed between the pixel units 120, and a plurality of protrusions 126 disposed on the top substrate where correspond to the data lines 124. The pixel units 120 are driven by a plurality of switch elements 123 electrically connected to the scan lines 122, the data lines 124 and the pixel electrode 128, in which the switch elements are preferably thin film transistors.

Each of the pixel units 120 includes a pixel electrode 128 having a plurality of fine slits 129. Depending on the design of the product, the fine slits 129 can be formed in the pixel electrode 128 or extended to the edge of the pixel electrode 128. As shown in FIG. 11, the protrusions 126 of the sixth embodiment are disposed corresponding to the center of the data lines 124 between two adjacent pixel units 120. Hence, a protrusion 126 can be shared by every two adjacent pixel units 120 for increasing the usability of the pixels.

Seventh Embodiment

Figure 12:
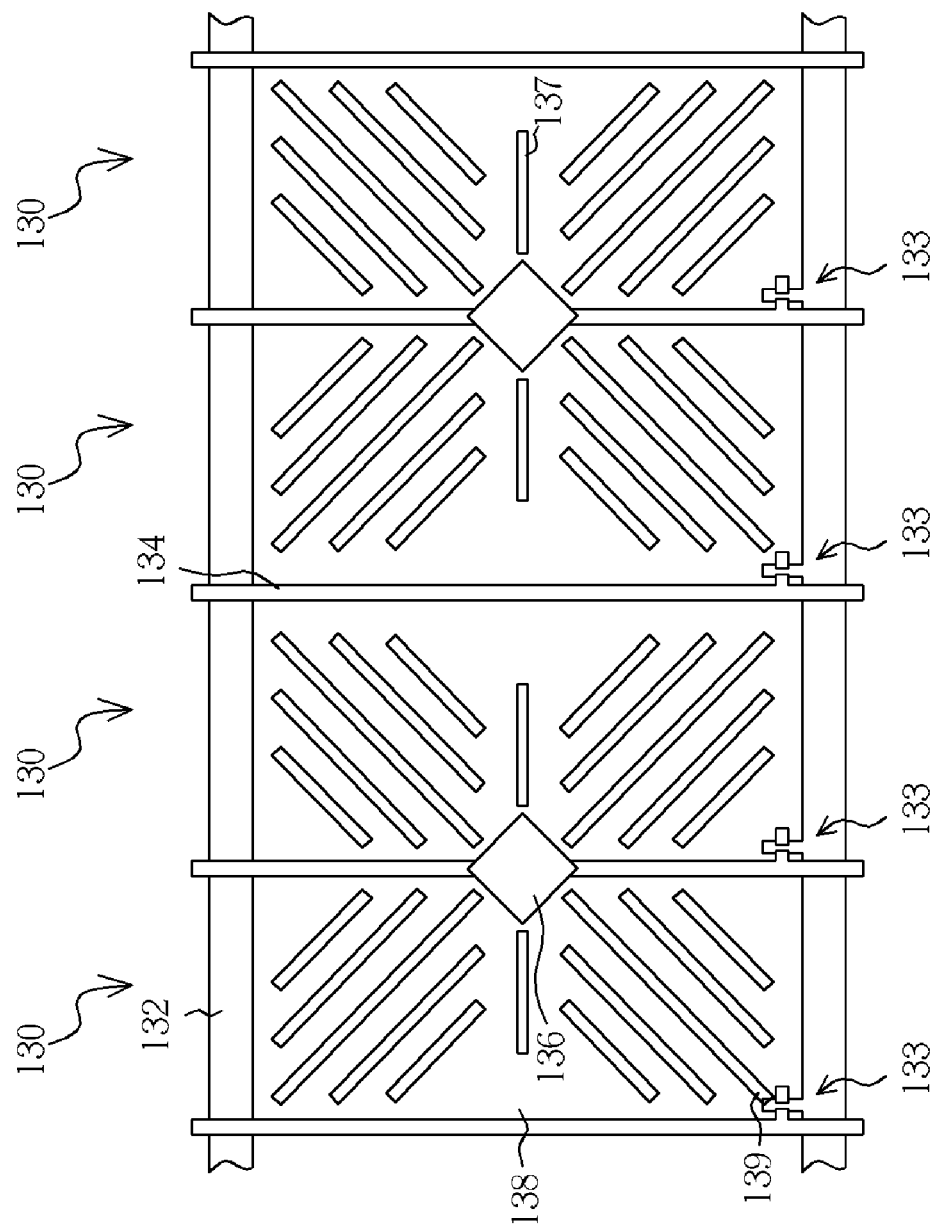
FIG. 12 illustrates a plan view of the pixel units of the MVA LCD panel according to the seventh embodiment of the present invention.

Please refer to FIG. 12. FIG. 12 illustrates a plan view of the pixel units of the MVA LCD panel according to the seventh embodiment of the present invention. As shown in FIG. 12, the MVA LCD panel includes four pixel units 130, a plurality of scan lines 132 and data lines 134 disposed between the pixel units 130, and a plurality of protrusions 136 disposed on the top substrate where correspond to the center of the data lines 134. The pixel units 130 are driven by a plurality of switch elements 133 electrically connected to the scan lines 132, the data lines 134, and the pixel electrode 138, in which the switch elements 133 are preferably thin film transistors.

Each of the pixel units 130 includes a pixel electrode 138 having a plurality of fine slits 139. Depending on the design of the product, the fine slits 139 can be formed in the pixel electrode 138 or extended to the edge of the pixel electrode 138. Similar to the sixth embodiment, the protrusions 136 are positioned corresponding to the center of the data lines 134 between two adjacent pixel units 130. In addition to the fine slits 139, the pixel electrode 138 of the seventh embodiment also includes a plurality of main slits 137 disposed in the central region of the pixel electrode 138.

Eighth Embodiment

Figure 13:
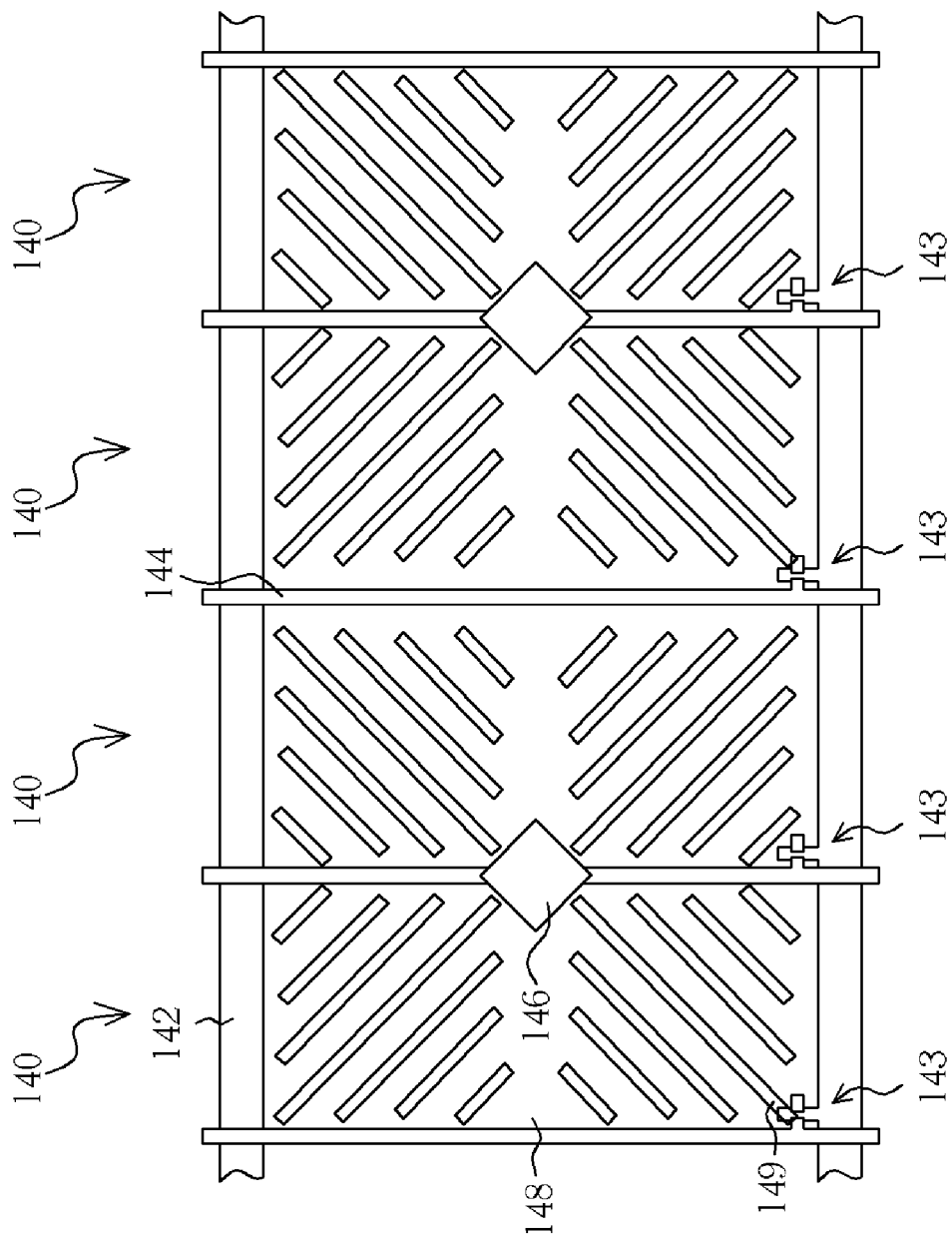
FIG. 13 illustrates a plan view of the pixel units of the MVA LCD panel according to the eighth embodiment of the present invention.

Please refer to FIG. 13. FIG. 13 illustrates a plan view of the pixel units of the MVA LCD panel according to the eighth embodiment of the present invention. As shown in FIG. 13, the MVA LCD panel includes four pixel units 140, a plurality of scan lines 142 and data lines 144 disposed between the pixel units 140, and a plurality of protrusions 146 disposed on the top substrate where correspond to the data lines 144. The pixel units 140 are driven by a plurality of switch elements 143 electrically connected to the scan lines 142, the data lines 144, and the pixel electrode 148, in which the switch elements 143 are preferably thin film transistors.

Each of the pixel units 140 includes a pixel electrode 148 having a plurality of fine slits 149. Depending on the design of the product, the fine slits 149 can be formed in the pixel electrode 148 or extended to the edge of the pixel electrode 148. In addition to the protrusions 146 disposed corresponding to the data lines 144, the quantity of fine slits 149 of this embodiment is significantly higher than the one disclosed in the sixth embodiment. The protrusions 146 are disposed corresponding to the center of the data line 144, in which a protrusion 146 can be shared by every two adjacent pixel units 140 for increasing the usability of the pixels.

Ninth Embodiment

Figure 14:
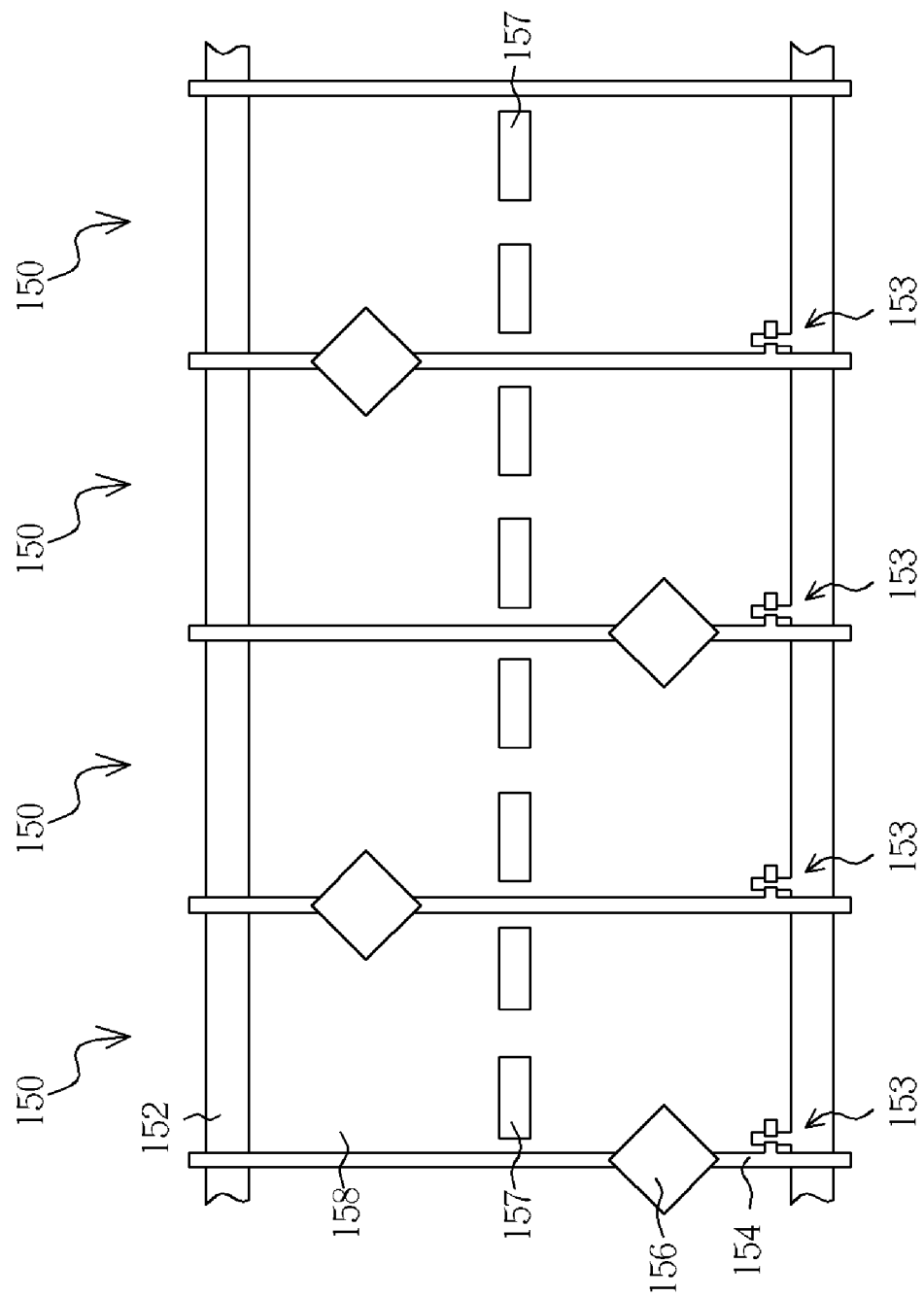
FIG. 14 illustrates a plan view of the pixel units of the MVA LCD panel according to the ninth embodiment of the present invention.

Please refer to FIG. 14. FIG. 14 illustrates a plan view of the pixel units of the MVA LCD panel according to the ninth embodiment of the present invention. As shown in FIG. 14, the MVA LCD panel includes four pixel units 150, a plurality of scan lines 152 and data lines 154 disposed between the pixel units 150, and a plurality of protrusions 156 disposed on the top substrate where correspond to the data lines 154. The pixel units 150 are driven by a plurality of switch elements 153 electrically connected to the scan lines 152, the data lines 154, and the pixel electrode 158, in which the switch elements 153 are preferably thin film transistors.

Each of the pixel units 150 includes a pixel electrode 158 having a plurality of main slits 157. Depending on the design of the product, the main slits 157 can be formed in the pixel electrode 158 or extended to the edge of the pixel electrode 158. In contrast to the aforementioned embodiments, the protrusions 156 of the ninth embodiment are disposed according to a scattering manner corresponding to each of the data lines 154, such that each of the pixel units 150 would have a pixel domain of four different directions. Additionally, the protrusions 156 are not disposed corresponding to the center of the pixel units 150, but are disposed according to an alternating manner, which can be either regular or irregular.

Tenth Embodiment

Figure 15:
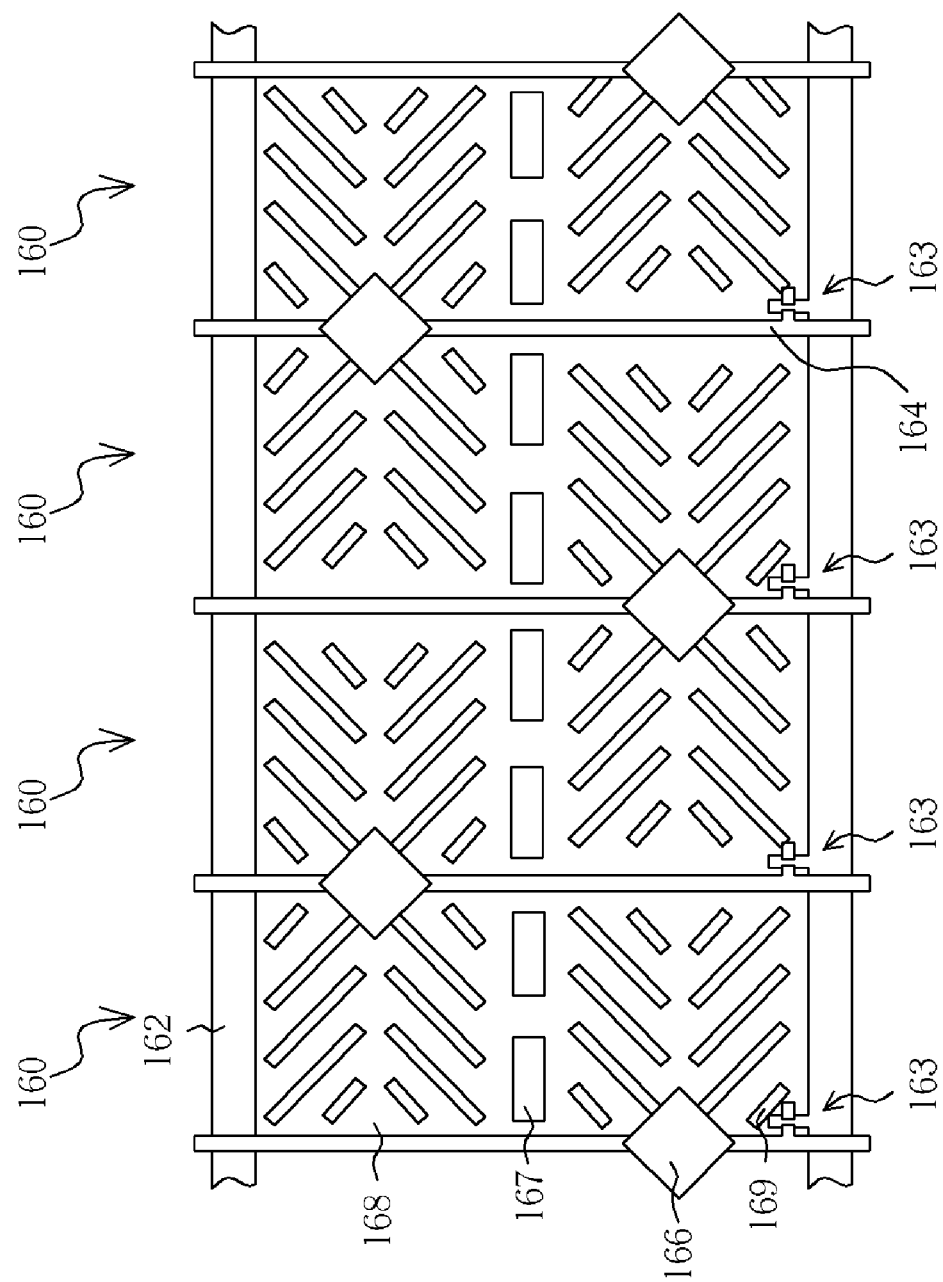
FIG. 15 illustrates a plan view of the pixel units of the MVA LCD panel according to the tenth embodiment of the present invention.

Please refer to FIG. 15. FIG. 15 illustrates a plan view of the pixel units of the MVA LCD panel according to the tenth embodiment of the present invention. As shown in FIG. 15, the MVA LCD panel includes four pixel units 160, a plurality of scan lines 162 and data lines 164 disposed between the pixel units 160, and a plurality of protrusions 166 disposed on the top substrate where correspond to the data lines 164. The pixel units 160 are driven by a plurality of switch elements 163 electrically connected to the scan lines 162, the data lines 164, and the pixel electrode 168, in which the switch elements 163 are preferably thin film transistors.

Each of the pixel units 160 includes a pixel electrode 168 having a plurality of main slits 167 and fine slits 169. Depending on the design of the product, the main slits 167 and the fine slits 169 can be formed in the pixel electrode 168 or extended to the edge of the pixel electrode 168. In contrast to the ninth embodiment, the tenth embodiment not only places the protrusions 166 in an alternating manner corresponding to each data line 164, but also includes a plurality of fine slits 169. In this embodiment, a protrusion 166 can be shared by two adjacent pixel units 160 to increase the usability of the pixels.

In the aforementioned embodiments, the main slits and the fine slits are specifically formed in the pixel electrodes. However, depending on the design of the product, the main slits and the fine slits can be formed according to a fish-bone shape within the pixel electrode or extended to the edge of the pixel electrode, which are all within the scope of the present invention.

In contrast to the conventional MVA LCD panels of placing the protrusions in the relative central position of the pixel electrode, the present invention preferably places the protrusions on the top substrate where correspond to the scan lines or data lines formed between the pixel units. By having this design, the number of protrusions can be reduced significantly while fabricating display panels having much higher resolution. Additionally, a plurality of main slits and fine slits can also be formed in the pixel electrode and the number of protrusions can be reduced to increase the aperture of the display panel, increase the stability of the liquid crystal arrangement, reduce the phenomenon of light leakage and increase the overall contrast.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A liquid crystal display panel, comprising:
a bottom substrate;
a plurality of wires disposed on the bottom substrate;
a plurality of pixel units electrically connected to the wires, wherein each of the pixel units comprises:
a thin film transistor disposed on the bottom substrate; and
a pixel electrode, having a plurality of main slits, disposed on the bottom substrate and electrically connected to the thin film transistor;
a top substrate disposed opposite to the bottom substrate;
a liquid crystal layer disposed between the top substrate and the bottom substrate; and
at least one protrusion disposed on the top substrate opposite to the surface of the bottom substrate and corresponding to the wires formed between two adjacent pixel units, wherein the liquid crystal layer is disposed between the protrusion and the wires.

2. The liquid crystal display panel of claim 1, further comprising a color filter disposed on the top substrate.

3. The liquid crystal display panel of claim 1, further comprising a color filter disposed on the bottom substrate.

4. The liquid crystal display panel of claim 1, wherein the pixel electrode further has a plurality of fine slits.

5. The liquid crystal display panel of claim 1, wherein the pixel electrode is comprised of indium tin oxide or indium zinc oxide.

6. The liquid crystal display panel of claim 1, wherein the protrusion is a rectangular shape or a circular shape.

7. The liquid crystal display panel of claim 1, wherein the wires comprise scan lines or data lines.

8. The liquid crystal display panel of claim 7, wherein the protrusion is disposed corresponding to the overlapped portion of the scan line and data line.

9. A liquid crystal display panel, comprising:
a first substrate and a second substrate opposite to the first substrate;
a liquid crystal layer disposed between the first substrate and the second substrate;
a plurality of pixel electrodes, having a plurality of main slits, disposed on the second substrate;
a plurality of wires disposed on the second substrate and between the pixel electrodes; and
at least one protrusion disposed on the first substrate and corresponding to the wires, wherein the liquid crystal layer is disposed between the protrusion and the wires.

10. The liquid crystal display panel of claim 9, wherein each of the pixel electrodes comprises a plurality of fine slits.

11. The liquid crystal display panel of claim 9, further comprising a common electrode disposed on the first substrate.

12. The liquid crystal display panel of claim 11, further comprising a plurality of color filters disposed between the first substrate and the common electrode.

13. The liquid crystal display panel of claim 9, wherein the pixel electrodes is comprised of indium tin oxide or indium zinc oxide.

14. The liquid crystal display panel of claim 9, wherein the protrusion is disposed corresponding to the overlapped portion of the wires.

15. The liquid crystal display panel of claim 9, wherein the protrusion is a rectangular shape or a circular shape.

16. The liquid crystal display panel of claim 9, wherein the protrusion is disposed corresponding to the wires other than the overlapped portion of the wires.

* * * * *